United States Patent Office 2,768,179
Patented Oct. 23, 1956

2,768,179

ENDRIN STABILIZATION

Richard H. Bellin, Denver, Colo., assignor to Shell Development Company, New York, N. Y., a corporation of Delaware No Drawing. Application July 26, 1954,
Serial No. 445,931

13 Claims. (Cl. 260—348)

This invention pertains to a method for stabilizing epoxysubstituted octahydro-endo,endo-dimethanonaphthalene compounds containing halogen substituents. More particularly, the invention pertains to a method for stabilizing 6,7 - epoxy - 1,2,3,4,10,10 - hexachloro - 1,4,4a, 5, 6, 7, 8, 8a - octahydro - 1,4,5,8 - endo,endo - dimethanonaphthalene. The invention also pertains to the new and stable compositions which for the first time now are provided by the present invention.

Epoxy - substituted octahydro - endo,endo - dimethanonaphthalene compounds containing halogen substituents, such as 6,7 - epoxy - 1,2,3,4,10,10 - hexachloro - 1,4,4a, 5,6,7,8,8a - octahydro - 1,4,5,8 - endo,endo - dimethanonaphthalene, have recently been made known and have been found to have considerable value as insecticides. Serious difficulties have been encountered in the production and use of these compounds, however, owing to their chemical instability. These difficulties have been particularly serious with 6,7-epoxy-1,2,3,4,10,10-hexachloro - 1,4,4a,5,6,7,8,8a - octahydro - 1,4,5,8 - endo,endo-dimethanonaphthalene. Like certain of their insecticidal properties, the chemical instability of these epoxy- and halogen-substituted octahydro-endo,endo-dimethanonaphthalene compounds appears to be attributable in large measure to their particular stereochemical configuration, and not merely to the nature of the substituent groups and atoms which are present. For example, under conditions where 6,7 - epoxy - 1,2,3,4,10,10 - hexachloro-1,4,4a,5,6,7,8,8a - octahydro - 1,4,5,8 - endo,endo - dimethanonaphthalene undergoes irreversible, substantially complete conversion in but a few hours to products having little if any insecticidal activity, even as closely related a compound as 6,7, - epoxy - 1,2,3,4,10,10 - hexachloro-1,4,4a,5,6,7,8,8a - octahydro - 1,4,5,8 - endo,exo - dimethanonaphthalene has been found to be substantially stable.

It is therefore one of the principal objects of this invention to provide means for overcoming the observed chemical instability of the epoxy-substituted octahydro-endo, endo-dimethanonaphthalene compounds containing halogen substituents, especially of 6,7 - epoxy - 1,2,3,4,10,10-hexachloro - 1,4,4a,5,6,7,8,8a - octahydro - 1,4,5,8 - endo, endo-dimethanonaphthalene, which at the present time is the most readily available of these compounds.

Other and more specific objects of the invention will be apparent from the accompanying disclosures and claims.

The chemical compound 6,7 - epoxy - 1,2,3,4,10,10-hexachloro - 1,4,4a,5,6,7,8,8a - octahydro - 1,4,5,8 - endo, endo-dimethanonaphthalene is also known as the epoxide of the Diels-Alder adduct of 1,2,3,4,7,7-hexachlorobicyclo(2.2.1)-2,5-heptadiene and cyclopentadiene. When pure it is a white crystalline material melting with decomposition at about 245° C. It can be prepared by epoxidation of this Diels-Alder adduct using, for example, peracetic acid as the epoxidizing agent. The 1,2,3,4,7,7-hexachlorobicyclo(2.2.1)-2,5-heptadiene can be prepared of hexachlorocyclopentadiene and vinyl chloride, for example, by treatment with an alcoholic solution of a caustic in turn by dehydrochlorination of the Diels-Alder adduct alkali. The chemical structure of 6,7-epoxy-1,2,3,4,10,10-hexachloro - 1,4,4a,5,6,7,8,8a - octahydro - 1,4,5,8 - endo, endo-dimethanonaphthalene can be represented in planar form by the structural formula

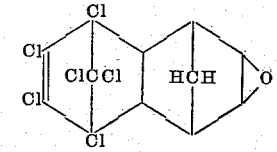

The geometrical configuration can be indicated by the following three-dimensional formula:

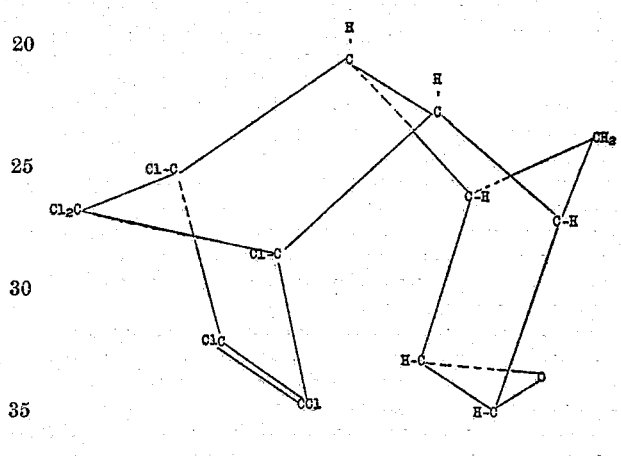

In other epoxy- and halogen-substituted octahydro-endo, endo-dimethanonaphthalene compounds with which the invention is concerned, chlorine shown in the above formulas may be replaced by other halogens, for example bromine, and/or hydrogen shown in the formulas may be replaced by a substituent group, such as an alkyl group, an ester group, or an alkoxy group. In each case, however, there will be present the six halogen atoms on the one ring and the stereochemical configuration will be the illustrated endo-endo configuration.

When an epoxy- and halogen-substituted-endo,endo-dimethanonaphthalene compound, such as 6,7-epoxy-1,2,3, 4,10,10 - hexachloro - 1,4,4a,5,6,7,8,8a - octahydro - 1,4, 5,8-endo,endo-dimethanonaphthalene, is stored at ambient temperatures or is heated for shorter periods of time at elevated temperatures it undergoes a chemical transition which essentially destroys the valuable insecticidal activity of the compound. This transition reaction has been found to occur even though the compound is in the crystalline form and therefore of a high degree of purity.

It now has been discovered in accordance with the present invention that this chemical transition can be prevented by incorporating with the epoxy- and halogen-substituted octahydro-endo,endo-dimethanonaphthalene compound relatively small amounts of certain chemical additives and that in this manner a product of greatly improved stability can be obtained. These chemical additives which now have been found to act as stabilizers for the epoxy- and halogen-substituted octahydro-endo, endo-dimethanonaphthalene compounds are the soluble alkalinous metal salts of acidic aromatic compounds having directly substituted on an aryl nucleus thereof both the hydroxyl group and an alkyl group, preferably a long-chain alkyl group, such as one containing from 5 to 20 carbon atoms.

For most effective stabilization, the aromatic alkalinous metal salt is incorporated with the solid, usually crystalline, epoxy- and halogen substituted octahydro-endo,endo-dimethanonaphthalene compound in such a manner that it is intimately and more or less uniformly distributed throughout the bulk of the material which is to be stabilized. This can be accomplished effectively by crystallizing, or precipitating, the epoxy- and halogen-substituted octahydro - endo,endo - dimethanonaphthalene compound from a solution containing small amounts of the soluble alkalinous metal salt, thereby occluding the stabilizer within and among the solid particles or crystals of the epoxy- and halogen-substituted octahydro-endo,endo-dimethanonaphthalene.

The alkalinous metal salts of alkyl-substituted phenolic compounds which are employed as stabilizers in accordance with the invention are represented in the preferred instance by the alkalinous metal salts of the condensation product of formaldehyde with alkyl phenols wherein the alkyl group is of sufficient chain length, or contains a sufficient number of carbon atoms, to impart to the alkalinous metal salt solubility in organic solvents, such as mineral oil, benzene, toluene, acetone and the like. The alkyl group thus may contain from about 5 up to about 20 carbon atoms; a particularly suitable chain length is about 8 carbon atoms. The term "alkalinous metal" is employed herein to include both the alkali metals, such as sodium, potassium, lithium, rubidium, and cesium, and the alkaline earth metals, including magnesium, calcium, strontium, barium, and zinc. The preferred salts are the salts of the light metals, particularly the metals of group II–A of the periodic table. For most purposes the calcium salts are especially well suited to the method of stabilization of the invention.

The condensation products of formaldehyde with alkyl phenols generally will have a molecular weight in the range of from about 350 to about 2000. Suitable products have been prepared by effecting the condensation in the presence of an acid catalyst as well as in the presence of a basic catalyst. For example, a suitable condensation product has been prepared by condensing para-octyl phenol with formaldehyde, supplied as an aqueous 37% formalin solution, in approximately 1:1 mole ratio with about 0.5 mole of lime present as the condensation catalyst. Condensation occurred while the mixture was heated at 70–80° C. with stirring, and was essentially completed after about 45 minutes. By allowing the reaction mixture to stratify and after removal of the aqueous phase, there was obtained as the organic residue the calcium salt of the alkyl phenol-formaldehyde condensation product produced simultaneously with the condensation reaction. Equivalent alkalinous metal salts of alkyl phenol-formaldehyde condensation products have been prepared by condensing the formaldehyde and alkyl phenol in the presence of such basic catalysts as sodium hydroxide, sodium carbonate, hexamethylenetetramine, and benzyl tetramethyl ammonium hydroxide, as well as by condensation in the presence of acidic catalysts such as alkane sulfonic acids followed by calcification of the reaction product by reaction with lime. The condensation products preferably are prepared utilizing approximately equimolar amounts of the alkyl phenol and formaldehyde. This is not critical, however, and there may be employed more generally from about 0.2 mole up to about 1 mole of formaldehyde per mole of the alkyl phenol. In order to minimize undesired resinification the use of a substantial excess of formaldehyde preferably should be avoided.

Alkyl phenols from which condensation products suitable for the present purposes can be prepared include the phenols having one or more alkyl groups on the aryl nucleus and at least one of the alkyl groups being a relatively long-chain alkyl group, such as one containing from 5 to 20 carbon atoms. Para-amyl phenol, para-hexyl phenol, para-octyl phenol, para-dodecyl phenol, para-hexadecyl phenol, para-octyl cresol, and para-nonyl-meta-ethyl phenol are typical of the alkylated phenols which can be employed. Since the alkylated phenol usually will be prepared by alkylation of phenol or a substituted phenol, the long-chain alkyl group usually will occupy the para position and in order to facilitate condensation with the formaldehyde the meta positions ordinarily should be unsubstituted.

Although the preferred stabilizing agents are the alkalinous metal salts of the formaldehyde-alkyl phenol condensation products, there may also be employed condensation products prepared equivalently, utilizing other lower aliphatic aldehydes than formaldehyde, such as acetaldehyde, propionaldehyde, butyraldehyde and acrolein.

Instead of an alkalinous metal salt of an alkyl phenol-formaldehyde condensation product there may be employed as the stabilizing agent in accordance with the invention other soluble alkalinous metal salts of phenolic compounds, such as oil-soluble alkalinous metal salts of long-chain alkyl-substituted aromatic compounds having both a hydroxyl group and a second acidic group, such as the carboxylic group, substituted on the aryl nucleus. Such phenolic compounds may be prepared according to known procedures by alkylating phenol or a substituted phenol with an olefin or equivalent reactant containing from about 5 to about 20 carbon atoms and carboxylating the reaction product with carbon dioxide utilizing the well-known Kolbe reaction or modification thereof. Phenols from which such long-chain alkyl-substituted alkalinous metal phenates can be prepared by known methods include phenol itself, alkyl phenols, such as the cresols and mixtures thereof, and naphthols. The alkylation may be carried out utilizing an alcohol, alkyl halide, ether or an olefin as the alkylating agent; particularly suitable materials for the purposes of the present invention are alkalinous metal salicylates prepared by alkylating a phenol with olefins containing from 8 to 18 carbon atoms per molecule, carboxylating the alkylation product according to the Kolbe synthesis, and converting the resulting alkali metal salicylate to an alkaline earth metal (preferably calcium) salicylate by metathesis.

It is believed that the structure of the condensation products of the alkyl phenol with the aldehyde can be represented substantially as by the following formula:

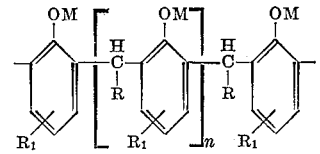

wherein the aryl groups are substituted at least by a relatively long-chain alkyl group $R_1$, R represents hydrogen or hydrocarbon according to the aldehyde reactant that was used, and M is the hydrogen equivalent of the alkalinous metal. The condensation products will generally contain a mixture of individual compounds having this probable formula wherein $n$ ranges from 0 up to 5 or even more. The word "compound" as used in reference to these condensation products is not intended to exclude the presence of more than one molecular species. The alkalinous metal salts of salicylates have structures that apparently can be represented as follows:

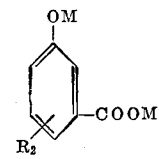

in which $R_1$ represents the alkyl substituent.

A suitable alkalinous metal salicylate has been prepared, for example, by alkylating phenol with a mixture of alpha-olefins containing from 14 to 18 carbon atoms per molecule in the presence of zinc chloride/hydrogen chloride as catalyst, neutralizing the phenol with sodium hydroxide, preparing an anhydrous solution of the sodium alkyl phenate in xylene, carboxylating by reaction with carbon dioxide under pressure, and combining the resulting salicylate with lime. The anhydrous solution of the sodium alkyl phenate in xylene can be prepared conveniently by reacting the alkylate with the equivalent amount of a methanolic solution of sodium hydroxide, and then adding xylene and distilling methanol, water and xylene from the mixture until there remains an essentially anhydrous solution of the sodium alkyl phenate in xylene. The carboxylation is carried out, for example, by heating the xylene solution with carbon dioxide under a pressure of about 4–8 atmospheres at about 135–145° C. for 4–8 hours. Acidification of the carboxylation product yields a xylene solution of long-chain alkyl salicylic acids which may be neutralized with lime or other alkalinous metal base to produce the stabilizing agent. Alternatively, the carboxylation product itself may be neutralized with an additional amount of sodium or other alkalinous metal base to provide a product useful for the purposes of the present invention.

Although the alkalinous metal salts of the alkyl phenol-aldehyde condensation products or of salicylic acids constitute the preferred stabilizing agents of the invention, in consideration of both effectiveness and availability, there may also be employed alkalinous metal phenates of the relatively simpler phenols, such as simply the alkalinous metal phenates of such substituted phenols as para-octyl phenol, para-amyl phenol, para-dodecyl phenol, para-hexadecyl phenol and their homologs and analogs. It is particularly preferred, however, that the stabilizing agent be a material wherein there can be incorporated what is known in the art as excess or reserve alkalinity; that is to say, an amount of alkalinous metal base in excess of the amount theoretically required to combine with the acidity of the acidic aromatic compound. Such excess or reserve alkalinity is best provided by combining lime or other alkaline earth metal hydroxide or carbonate with a solution of a long-chain alkyl salicylate, an aldehyde-alkyl phenol condensation product or equivalent phenolic material in a neutral organic solvent such as a petroleum fraction distilling in the lubricating oil range. The excess of alkalinous metal base may be present in the form of a complex with the phenolic material or in some cases it may be finely dispersed and suspended as such in the solution, for example, as a colloidal dispersion. Commercially available mineral oil solutions of the alkalinous metal salts of aldehyde-alkyl phenol condensation products, containing from 5 to 25% by weight or more of sulfate ash, have been used with particular success in accordance with the invention.

The stabilizing agents may be available in either liquid or solid state, depending upon the particular material under consideration and they may be employed in such normal form. Only a single stabilizing agent may be employed according to the invention, or mixtures thereof to be used.

The alkalinous metal phenates may be incorporated with the epoxy- and halogen-substituted octahydro-endo,endo-dimethanonaphthalene compounds by any suitable method to provide the novel compositions of the invention. When the epoxy- and halogen-substituted octahydro-endo,endo-dimethanonaphthalene compound is at hand as a solid, such as a flaked product or a crystalline material, the stabilizing agent may be incorporated by dry mixing, or by blending a solution of the stabilizing agent in a suitable solvent with the solid epoxy- and halogen-substituted octahydro-endo,endo-dimethano- naphthalene compound and thereafter permitting the solvent to evaporate.

A particularly effective method, which has been employed with advantage in the preparation of stable crystalline 6,7-epoxy-1,2,3,4,10,10-hexachloro-1,4,4a,5,6,7,8,-8a - octahydro - 1,4,5,8 - endo,endo - dimethanonaphthalene (endrin), is to add the stabilizing agent to a solution of the epoxy- and halogen-substituted octahydro-endo,endo-dimethanonaphthalene in an organic solvent for such compound and to crystallize the epoxy- and halogen-substituted octahydro-endo,endo-dimethanonaphthalene compound from the solution in the presence of the added stabilizing agent. It appears that the stabilizing agent is occluded in the crystals of the epoxy- and halogen - substituted octahoydro - endo,endo - dimethanonaphthalene compound and that this occlusion may account for the remarkable stabilities which have been obtained by proceeding in this manner. The solvent may be, for example, benzene, toluene, carbon tetrachloride, isooctane or other inert volatile organic solvent for the epoxy- and halogen-substituted octahydro-endo,-endo-dimethanonaphthalene compound. The concentration of the epoxy- and halogen-substituted octahydro-endo,endo-dimethanonaphthalene compound in the solution may vary between about 10 and 60%, although these figures are not critical. The stabilizing agent is added to the solution in an amount preferably between about 0.5 and about 5%, based upon the solids content of the solution. The crystallization of the epoxy- and halogen - substituted octahydro - endo,endo - dimethanonaphthalene compound in the presence of the added stabilizing agent may be carried out by conventional methods, such as by concentrating the solution through evaporation and cooling the concentrated solution to bring about crystallization. The crystallization, of course, may be carried out either batchwise or continuously.

The amount of stabilizing agent incorporated, regardless of the method of incorporation used, generally should be within the range of from about 0.05% to about 15% by weight of the epoxy- and halogen-substituted octahydro - endo,endo - dimethanonaphthalene compound, and preferably is within the range of from about 0.5 to about 5% by weight of the epoxy- and halogen-substituted octahydro-endo,endo-dimethanonaphthalene compound.

In typical experiments carried out according to the invention there has been employed an oil-soluble calcium salt of a formaldehyde-alkyl phenol condensation product produced by condensing para-octyl phenol and formaldehyde in the presence of an aqueous slurry of lime, and dissolving the resulting calcium salt in a light petroleum base lubricating oil. A benzene solution of endrin containing about 20% by weight endrin was washed with water and then dried. To the benzene solution there was added about 0.5% by weight, based upon the weight of endrin, of the calcium phenolate in the form of the solution in mineral oil. The benzene then was removed by evaporation to leave a solid, mostly crystalline residue consisting of the stabilized technical endrin. A portion of this solid was stored at 100° C. and analyzed periodically by means of the infrared absorption to determine the length of time required for the content of 1,8,9,10,11,11 - hexachloropentacyclo(6.2.1.-1$^{3,6}$.0$^{2,7}$.0$^{4,10}$)dodecan-5-one in the sample to reach 3% by weight. This compound is a primary decomposition product of endrin; its concentration affords a convenient measure of the extent of decomposition of the endrin.

With the stabilized sample of endrin prepared as above it required 45 days heating at 100° C. until the content of 1,8,9,10,11,11 - hexachloropentacyclo(6.2.1.1$^{3,6}$.0$^{2,7}$.0$^{4,10}$)-dodecan-5-one increased to 3%. A second sample, prepared in the identical manner, except with addition of 1% by weight of stabilizing agent, required 57 days heating at 100° C. for the content of 1,8,9,10,11,11-hexachloropentacyclo(6.2.1.1³,⁶.0²,⁷.0⁴,¹⁰)dodecan-5-one to rise to 3% by weight. When the experiments were repeated, but without adding any stabilizing agent, the content of 1,8,9,10,11,11 - hexachloropentacyclo(6.2.1.1³,⁶.0²,⁷.0⁴,¹⁰)-dodecan-5-one in the unstabilized sample increased to over 72% upon heating for 48 hours at 100° C.

As a result of the improved stabilities illustrated by these experiments, the novel, stable, solid (crystalline) compositions of this invention can be stored with notably greater safety than can the same epoxy- and halogen-substituted octahydro - endo,endo - dimethanonaphthalene compounds in the absence of stabilizing agents. The new compositions may be employed for the preparation of insecticidal dusts, wettable powders, sprays (which may be simple solutions or may be polyphase compositions, e. g., emulsions) by methods already known for the preparation of insecticidal compositions from these epoxy- and halogen-substituted octahydro-endo,endo-dimethanonaphthalene compounds. The insecticidal compositions prepared from the novel compositions of this invention have notably increased stabilities in compounding, storage, shipment and use. The presence of the stabilizing agent has been found to exert no deleterious effect as to insecticidal or other properties.

It will be appreciated that the invention should not be misconstrued as being limited otherwise than as indicated by the appended claims, and that the invention includes all those various specific embodiments which can be practiced by those skilled in the art in view of the disclosures without departure from the invention as defined by the appended claims.

I claim as my invention:

1. A composition of matter comprising an epoxy- and halogen-substituted octahydro-endo,endo-dimethanonaphthalene compound and as stabilizer therefor a stabilizing minor amount of a salt of a metal of the group consisting of alkali and alkaline earth metals and an oil-soluble alkyl phenol-formaldehyde condensation product wherein the alkyl group contains from 5 to 20 carbon atoms and the condensation product has a molecular weight between 350 and 2000.

2. A composition of matter comprising an epoxy- and halogen-substituted octahydro-endo,endo-dimethanonaphthalene compound and as stabilizer therefor a stabilizing minor amount of an alkaline earth metal phenate having substituted on the aryl nucleus thereof a long-chain alkyl group which contains from 5 to 20 carbon atoms, said phenate having a molecular weight between 350 and about 2000.

3. A composition of matter comprising an epoxy- and halogen-substituted octahydro-endo,endo-dimethanonaphthalene compound and as stabilizer therefor a salt of a metal of the group consisting of alkali and alkaline earth metals and a mineral oil-soluble condensation product of formaldehyde and an alkyl phenol having substituted on the aryl nucleus an alkyl group having from 5 to 20 carbon atoms, said condensation product having a molecular weight between 350 and 2000.

4. A composition of matter comprising an epoxy- and halogen-substituted octahydro-endo,endo-dimethanonaphthalene compound and as stabilizer therefor a stabilizing minor amount of a salt of a metal of the group consisting of alkali and alkaline earth metals and an oil soluble acidic phenolic compound of the group consisting of oil soluble alkyl phenol-aldehyde condensation products wherein the alkyl group contains from 5 to 20 carbon atoms and the condensation product has a molecular weight between 350 and 2000, alkyl-substituted salicylates wherein the alkyl group contains from 5 to 20 carbon atoms and alkyl-substituted monohydric phenols wherein the alkyl group contains from 5 to 20 carbon atoms.

5. A composition of matter comprising crystalline 6,7 - epoxy - 1,2,3,4,10,10 - hexachloro - 1,4,4a,5,6,7,8,8a - octahydro - 1,4,5,8 - endo,endo - dimethanonaphthalene and occluded within the crystals of said 6,7-epoxy-1,2,3,4,10,10 - hexachloro - 1,4,4a,5,6,7,8,8a - octahydro- 1,4,5,8 - endo,endo - dimethanonaphthalene a minor amount, sufficient to stabilize, of a salt of a metal of the group consisting of alkali and alkaline earth metals and the condensation product of formaldehyde with an alkyl phenol, the alkyl group on the phenol containing from 4 to 20 carbon atoms and the condensation product having a molecular weight between 350 and about 2000.

6. A method of stabilizing an epoxy- and halogen-substituted octahydro - endo,endo - dimethanonaphthalene compound which comprises incorporating therewith a stabilizing minor amount of a salt of a metal of the group consisting of alkali and alkaline earth metals and an oil-soluble alkyl phenol-formaldehyde condensation product wherein the alkyl group contains from 5 to 20 carbon atoms and the condensation product has a molecular weight between 350 and 2000.

7. A method of stabilizing an epoxy- and halogen-substituted octahydro-endo,endo-dimethanonaphthalene compound which comprises incorporating therewith a minor amount, sufficient to stabilize, of a salt of a metal of the group consisting of alkali and alkaline earth metals and an oil soluble acidic phenolic compound of the group consisting of alkyl phenol-aldehyde condensation products wherein the alkyl group contains from 5 to 20 carbon atoms and the condensation product has a molecular weight between 350 and 2000, alkyl-substituted salicylates wherein the alkyl group contains from 5 to 20 carbon atoms and alkyl-substituted monohydric phenols wherein the alkyl group contains from 5 to 20 carbon atoms.

8. A method of stabilizing an epoxy- and halogen-substituted octahydro-endo,endo-dimethanonaphthalene compound which comprises incorporating therewith a minor amount, sufficient to stabilize, of a mineral oil-soluble salt of a metal of the group consisting of alkali and alkaline earth metals and the condensation product of formaldehyde with an alkyl phenol having substituted on the aryl nucleus an alkyl group of from 5 to 20 carbon atoms, said condensation product having a molecular weight between 350 and 2000.

9. A method of stabilizing crystalline 6,7-epoxy-1,2,3, 4,10,10 - hexachloro - 1,4,4a,5,6,7,8,8a - octahydro - 1, 4,5,8-endo,endo-dimethanonaphthalene which comprises preparing a solution thereof in an organic solvent therefor, adding to the solution from about 0.5% to about 5%, based upon the weight of the 6,7-epoxy-1,2,3,4,10, 10 - hexachloro - 1,4,4a,5,6,7,8,8a - octahydro - 1,4,5, 8-endo,endo-dimethanonaphthalene, of an oil-soluble salt of a metal of the group consisting of alkali and alkaline earth metals and the condensation product of formaldehyde with an alkyl phenol wherein the alkyl group on the phenol contains from 5 to 20 carbon atoms and the condensation product has a molecular weight between 350 and 2000, and thereafter crystallizing 6,7-epoxy-1,2,3, 4,10,10 - hexachloro - 1,4,4a,5,6,7,8,8a - octahydro - 1, 4,5,8-endo,endo-dimethanonaphthalene from the solution in the presence of the added metal salt of the condensation product of formaldehyde and the alkyl phenol.

10. The method defined by claim 9 in which crystallization is effected by volatilization of organic solvent from the solution.

11. The method defined by claim 9 in which crystallization is induced by chilling.

12. A composition of matter consisting of an epoxy- and halogen-substituted octahydro-endo,endo-dimethanonaphthalene compound and as a stabilizer therefor from 0.05% to 15% of an oil-soluble salt of a metal of the group consisting of alkali and alkaline earth metals and a mineral oil-soluble condensation product of formaldehyde and an alkyl phenol having substituted on the aryl nucleus an alkyl group having from 5 to 20 carbon atoms, said condensation product having a molecular weight between 350 and 2000.

13. A method for stabilizing a composition consisting of an epoxy- and halogen-substituted octahydro-endo, endo-dimethanonaphthalene compound which comprises incorporating in said composition from 0.05% to 15% of an oil-soluble salt of a metal of the group consisting of alkali and alkaline earth metals and a mineral oil-soluble condensation product of formaldehyde and an alkyl phenol having substituted on the aryl nucleus an alkyl group having from 5 to 20 carbon atoms, said condensation product having a molecular weight between 350 and 2,000.

References Cited in the file of this patent

UNITED STATES PATENTS 2,676,132    Bluestone _____ Apr. 20, 1954

OTHER REFERENCES

Agricultural Chemicals 7:67 (September 1952).